United States Patent
Sato et al.

(10) Patent No.: US 12,078,618 B2
(45) Date of Patent: Sep. 3, 2024

(54) GAS CHROMATOGRAPH-MASS SPECTROMETER

(71) Applicant: SHIMADZU CORPORATION, Kyoto (JP)

(72) Inventors: Hideki Sato, Kyoto (JP); Takeshi Uchida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 308 days.

(21) Appl. No.: 17/617,508

(22) PCT Filed: Jun. 10, 2019

(86) PCT No.: PCT/JP2019/022968
§ 371 (c)(1),
(2) Date: Dec. 8, 2021

(87) PCT Pub. No.: WO2020/250282
PCT Pub. Date: Dec. 17, 2020

(65) Prior Publication Data
US 2022/0252552 A1    Aug. 11, 2022

(51) Int. Cl.
*G01N 30/06* (2006.01)
*H01J 49/04* (2006.01)
*G01N 30/02* (2006.01)

(52) U.S. Cl.
CPC ............. *G01N 30/06* (2013.01); *H01J 49/04* (2013.01); *G01N 2030/025* (2013.01); *G01N 2030/062* (2013.01)

(58) Field of Classification Search
CPC .... G01N 30/06; G01N 2030/025; H01J 49/04
See application file for complete search history.

(56) References Cited

U.S. PATENT DOCUMENTS 6,006,584 A    12/1999   Itoi

FOREIGN PATENT DOCUMENTS

| CN | 105866306 | * | 8/2016 | |
| DE | 102012211595 A1 | * | 1/2013 | ......... G01N 30/7206 |
| JP | 53-157793 U | | 12/1978 | |

(Continued)

OTHER PUBLICATIONS

Notice of Reasons for Refusal dated Jul. 12, 2022 from the Japanese Patent Office in JP Application No. 2021-525423.

(Continued)

*Primary Examiner* — Jamel E Williams
*Assistant Examiner* — Alex T Devito
(74) *Attorney, Agent, or Firm* — Sughrue Mion, PLLC

(57) ABSTRACT

A gas chromatograph-mass spectrometer includes a gas chromatograph having a column that separates a sample into components, a mass spectrometer provided in a vacuum housing, and an interface that introduces a sample that has been separated into components in the gas chromatograph into the mass spectrometer, and the interface includes a partition wall fixed to the vacuum housing to close an opening formed in the vacuum housing, a line pipe that is fixed to the partition wall to penetrate the partition wall, includes a sample outlet line of the column and introduces the sample into the mass spectrometer, a heater that heats the line pipe in an axial direction, and a fixer that fixes the heater being in contact with the partition wall.

5 Claims, 7 Drawing Sheets

(56) References Cited

FOREIGN PATENT DOCUMENTS

JP            10-283982 A     10/1998
WO        WO-9321654 A1 * 10/1993   ........ H01J 49/0404

OTHER PUBLICATIONS

International Search Report for PCT/JP2019/022968 dated Jul. 9, 2019 [PCT/ISA/210].
Written Opinion for PCT/JP2019/022968 dated Jul. 9, 2019 [PCT/ISA/237].
Chinese Office Action issued Mar. 21, 2024 in Application No. 201980097251.7.

* cited by examiner

GAS CHROMATOGRAPH-MASS SPECTROMETER

CROSS REFERENCE TO RELATED APPLICATIONS

This application is a National Stage of International Application No. PCT/JP2019/022968 filed Jun. 10, 2019.

TECHNICAL FIELD

The present invention relates to a gas chromatograph-mass spectrometer.

BACKGROUND ART

The gas chromatograph-mass spectrometer includes a gas chromatograph, a mass spectrometer and an interface (see Patent Document 1, for example). The interface couples the gas chromatograph to the mass spectrometer. A sample separated into components in the gas chromatograph is introduced into the mass spectrometer through the interface, and the mass spectrometer ionizes the sample that have been separated into the components, and separates and detects the components in accordance with "m/z." A heater block is provided in the interface, and a decrease in temperature of a column that passes through the interface is prevented.

CITATION LIST

[Patent Document]
[Patent Document 1] JP 10-283982 A

SUMMARY OF INVENTION

Technical Problem

However, there is a problem that temperature distribution in the interface is not uniform, a sample (a high boiling point component in particular) is adsorbed on a low temperature portion of the included column, and accuracy of analysis is degraded.

Solution to Problem

According to a first aspect of the present invention, a gas chromatograph-mass spectrometer includes a gas chromatograph having a column that separates a sample into components, a mass spectrometer provided in a vacuum housing, and an interface that introduces a sample that has been separated into components in the gas chromatograph into the mass spectrometer, and the interface includes a partition wall fixed to the vacuum housing to close an opening formed in the vacuum housing, a line pipe that is fixed to the partition wall to penetrate the partition wall, includes a sample outlet line of the column and introduces the sample into the mass spectrometer, a heater that heats the line pipe in an axial direction, and a fixer that fixes the heater being in contact with the partition wall.

According to a second aspect, in the gas chromatograph-mass spectrometer of the first aspect, the fixer presses the heater against the partition wall.

According to a third aspect of the present invention, in the gas chromatograph-mass spectrometer of the second aspect, the heater is placed around the line pipe, the fixer is a nut member on which a female screw portion, that is to be engaged with a male screw portion formed on an outer periphery of the line pipe, is formed, and the heater is fixed to be pressed against the partition wall when the nut member is rotated and fastened with respect to the line pipe.

According to a fourth aspect, in the gas chromatograph-mass spectrometer of the third aspect, a spring member is arranged between the nut member and the heater.

According to a fifth aspect, in the gas chromatograph-mass spectrometer of the second aspect, the fixer is a fixing plate that is fixed to the partition wall and interposes the heater between the fixer and the partition wall.

According to a sixth aspect, in the gas chromatograph-mass spectrometer according to any one of the first to fifth aspects, the line pipe is a bar-shaped member having a first end portion fixed to the partition wall to penetrate the partition wall and a second end portion inserted into an opening provided in a casing of the gas chromatograph, and the second end portion is inserted into the opening through a heat insulating member.

Advantageous Effects of Invention

With the present invention, uniformity of temperature distribution of the interface can be improved.

DESCRIPTION OF EMBODIMENTS

Figure 1:
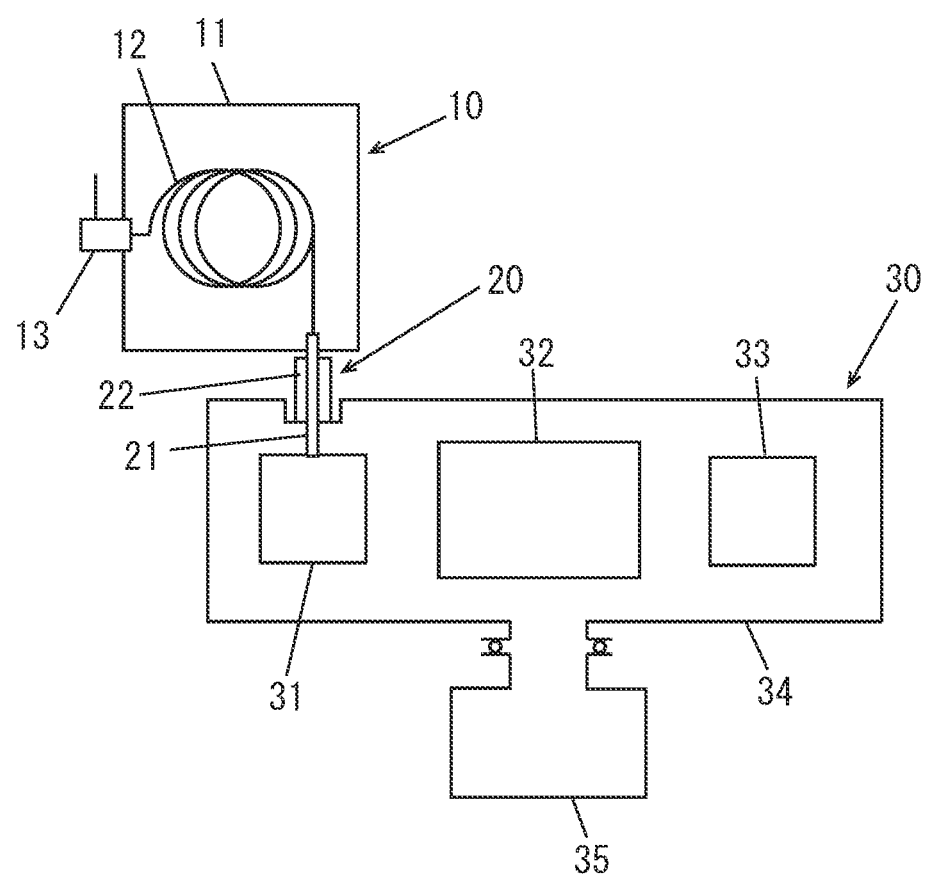
FIG. 1 is a schematic diagram showing the schematic configuration of a gas chromatograph-mass spectrometer.

Embodiments of the present invention will be described below with reference to the drawings. FIG. 1 is a schematic diagram showing the schematic configuration of a gas chromatograph-mass spectrometer. The gas chromatograph-mass spectrometer 1 includes a gas chromatograph 10, an interface 20 and a mass spectrometer 30. The gas chromatograph 10 separates a sample into components, which are mixed in the sample, over time. The interface 20 couples the gas chromatograph 10 and the mass spectrometer 30 to each other, and introduces a sample that has been separated into components in the gas chromatograph 10 into the mass spectrometer 30. The mass spectrometer 30 separates and detects components obtained by separation in the gas chromatograph 10 in accordance with "m/z."

The gas chromatograph 10 includes a column oven 11, a column 12 and an injector 13. Although not shown, the injector 13 has a sample vaporization chamber for heating and vaporizing a liquid sample, and a carrier gas (a He gas, for example) is supplied to the sample vaporization chamber at a predetermined flow rate. The liquid sample that has been injected into the sample vaporization chamber by a microsyringe or the like is vaporized in the sample vaporization chamber and is sent into the column 12 in a carrier gas stream. The column 12 is heated to a suitable temperature by the column oven 11.

The vaporized sample (that is, a sample gas) travels in the column 12 together with the carrier gas. A plurality of components are included in the sample gas, and the speed at which the components travel in the column 12 are different. Thus, respective components arrive at an outlet port of the column 12 at different points in time. As a result, the respective components into which the sample gas is separated into over time arrive at the outlet port of the column 12.

The interface 20 includes a line pipe 21 into which a sample outlet line of the column 12 is inserted, and a heater block 22 for heating a line pipe 21. The line pipe 21 is heated by the heater block 22, so that the column 12 in the line pipe 21 is also heated.

The mass spectrometer 30 includes a ionization chamber 31, a separator 32 and a detector 33. The ionization chamber 31, the separator 32 and the detector 33 are housed in a vacuum housing 34 that is evacuated to a vacuum level by a vacuum pump 35. An electronic source (not shown) that generates an electron beam for ionization is provided in the ionization chamber 31, and sample molecules that have been introduced into the ionization chamber 31 from the interface 20 are ionized by the electron beam. Generated ions are sent into the separator 32 from the ionization chamber 31 and separated by the separator 32 in accordance with "m/z." The separated ions are detected by the detector 33.

Figure 2:
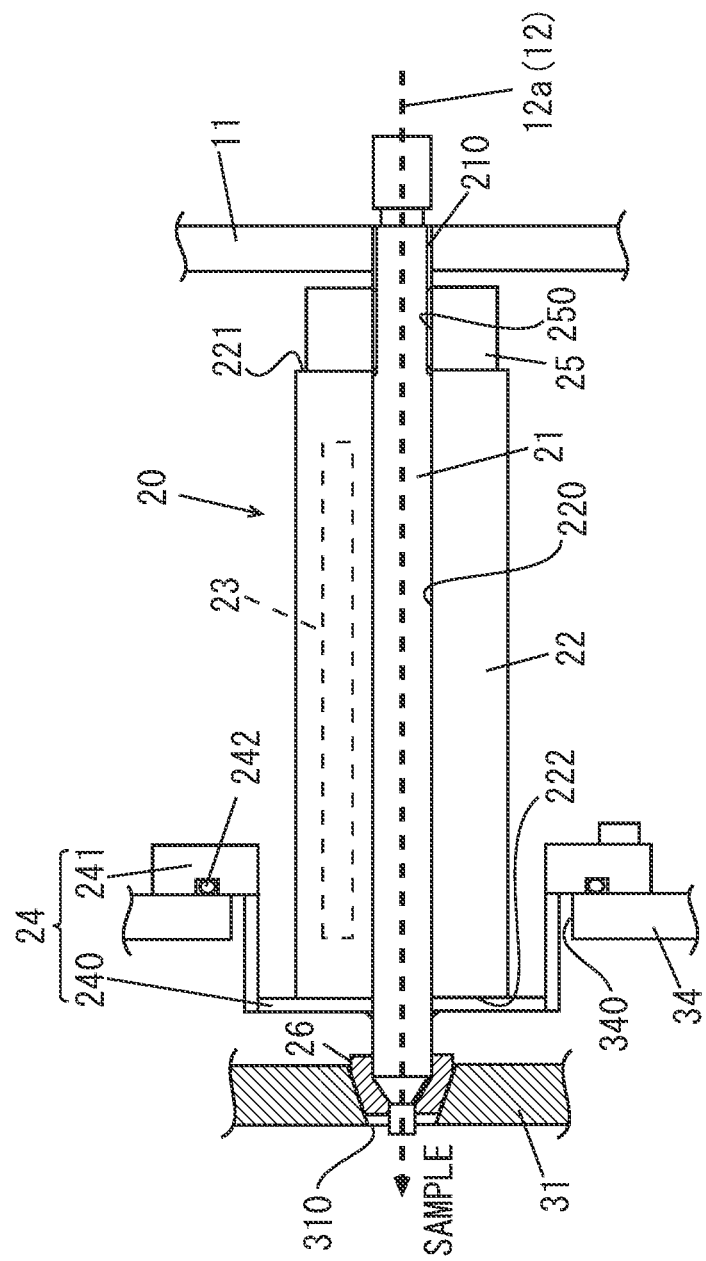
FIG. 2 is a cross sectional view showing the details of an interface.

FIG. 2 is a cross sectional view showing the details of the interface 20. The interface 20 is provided between the gas chromatograph 10 and the mass spectrometer 30. In detail, the interface 20 is provided between the column oven 11 in the right field in the diagram and the ionization chamber 31 in the left field in the diagram while being fixed to the vacuum housing 34 as described below. The interface 20 includes a partition wall portion 24 having a partition wall 240 and a flange 241, the line pipe 21 fixed to the partition wall 240, the heater block 22 in which a heater 23 is provided, and a nut member 25. A cartridge heater is used as the heater 23, for example. The line pipe 21 includes the sample outlet line 12a of the column 12, and a sample is introduced into the ionization chamber 31 from the tip of the line pipe 21. The tip of the line pipe 21 is fixed to the partition wall 240 to penetrate the partition wall 240. The line pipe 21 is fixed to the partition wall 240 by welding. A cap 26 is attached to the tip of the line pipe 21.

An opening 340 to which the partition wall portion 24 is fixed is formed in the vacuum housing 34 that houses the ionization chamber 31, the separator 32 and the detector 33. The flange 241 provided in the partition wall portion 24 is fixed to the vacuum housing 34 by bolts, so that the opening 340 is closed by the partition wall portion 24 to which the line pipe 21 is fixed. A vacuum seal 242 is provided between the flange 241 and the vacuum housing 34. When the partition wall portion 24 is fixed to the vacuum housing 34, the tip portion of the line pipe 21 to which the cap 26 is attached is inserted into an opening 310 of the ionization chamber 31.

The right end region of the line pipe 21, shown in the diagram, into which the column 12 is inserted is inserted into the column oven 11. On the outer peripheral surface of the right end portion of the line pipe 21, shown in the diagram, a male screw 210 with which a female screw 250 formed on the nut member 25 is to be engaged is formed. The heater block 22 is provided to surround the line pipe 21. For example, a through hole 220 that penetrates the columnar heater block 22 in an axial direction is formed, and the line pipe 21 is inserted into the through hole 220.

The heater block 22 is placed around the line pipe 21, and the nut member 25 is engaged with the male screw 210 of the line pipe 21. Thus, the heater block 22 is fixed to the line pipe 21 such that an end surface 222 directly comes into contact with the partition wall 240. Therefore, the partition wall 240 is directly heated by the heater block 22 not through another member and can have a temperature substantially equal to that of the heater block 22. With such a configuration, heat transfer from the partition wall 240 to the vacuum housing 34 can be suppressed, a decrease in temperature of the line pipe 21 due to heat dissipation through the partition wall 240 can be prevented, and temperature uniformity in regard to the axial direction of the line pipe 21 can be improved. In particular, a decrease in temperature of a portion of the line pipe 21 close to the vacuum housing 34 can be suppressed, and the temperature of a portion of the line pipe 21 close to the column oven 11 and the temperature of the portion of the line pipe 21 close to the vacuum housing 34 can be uniform as compared to the conventional configuration. The thickness of the partition wall 240 is set thin such that thermal resistance is large. Further, the partition wall 240 is configured to have a concave shape such that the distances (that is, thermal resistance) to a heater block contact region and the flange 241 are large. Further, due to its concave shape, the heater block contact region can be brought close to the tip of the line pipe 21, and a portion of the line pipe located as close as possible to the tip of the line pipe 21 can be heated.

On the other hand, in regard to the invention described in Patent Document 1, a line pipe is attached to a partition wall portion through a thermal resistance portion, and a heater block and the partition wall portion thermally comes into contact with each other through a thermally conducting member. However, because the thermally conducting member is merely in contact with part of the partition wall portion, the temperature of the partition wall portion is likely to be lower than that of the heater block, and the escape of heat from the line pipe through the heat resistance portion cannot be ignored. Therefore, the temperature of the tip portion of the line pipe is lower than that of a portion heated by the heater block, and temperature uniformity in regard to the axial direction of the line pipe is degraded. As a result, a problem such as adsorption of a sample (a high boiling point component) on a low temperature portion is likely to occur.

Further, the end surface 221 of the heater block 22 is pressed by fastening of the nut member 25, so that the end surface 222 of the heater block 22 is pressed against the partition wall 240. As a result, the end surface 222 can be reliably brought into contact with the partition wall 240 with a simple structure, and variations in contact state caused by variations in assembly work can be prevented. Further, the end surface 222 is pressed against the partition wall 240 by fastening of the nut member 25, so that a contact surface pressure of the end surface 222 with respect to the partition wall 240 is increased. As a result, efficiency of thermal conduction from the heater block 22 to the partition wall 240 is increased, so that a difference in temperature between the heater block 22 and the partition wall 240 can decrease more sufficiently.

Figure 3:
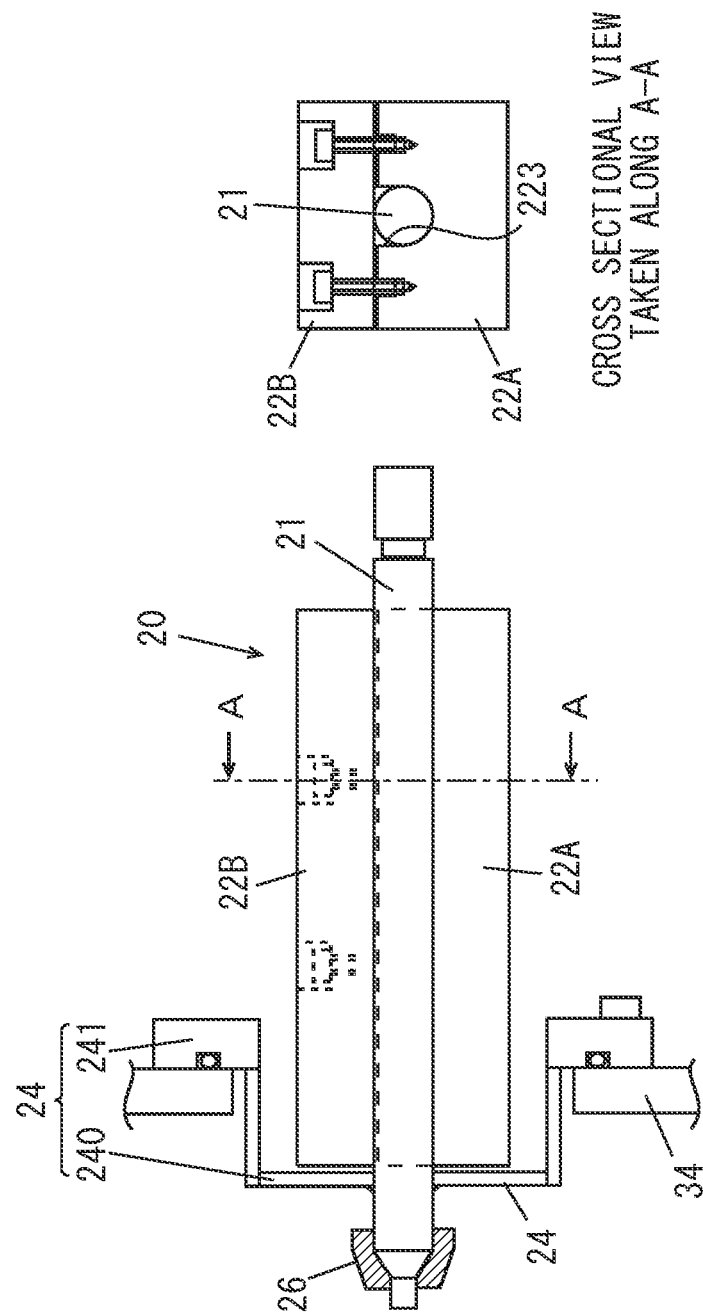
FIG. 3 is a diagram showing a comparative example.

For example, in regard to an attachment structure of a comparative example shown in FIG. 3, a line pipe 21 is housed in a groove 223 formed in a heater block 22A, and a heater block 22B is fastened to the heater block 22A by blots. Thus, the heater blocks 22A, 22B are fixed to the line pipe 21 to interpose the line pipe 21 therebetween. In regard to the comparative example, because the structure for pressing the heater blocks 22A, 22B against a partition wall 240 such as the nut member 25 shown in FIG. 2 is not provided, the contact between the heater blocks 22A, 22B and the partition wall 240 may be incomplete, a gap may be generated, etc. due to variations in assembly work. Thus, it is difficult to achieve a good contact state.

Figure 4:
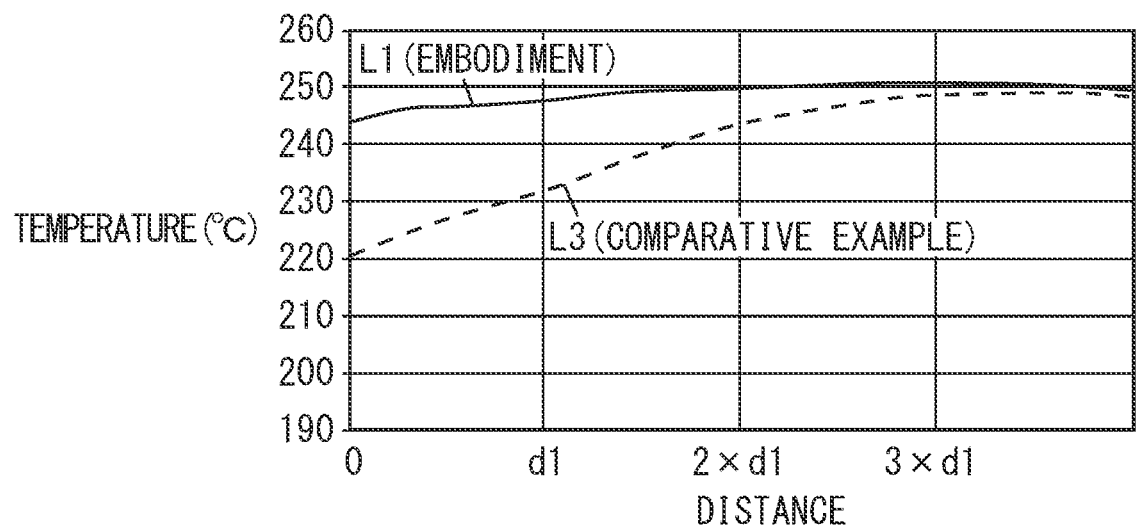
FIG. 4 is a diagram showing the temperature distribution in an axial direction.
Figure 5:
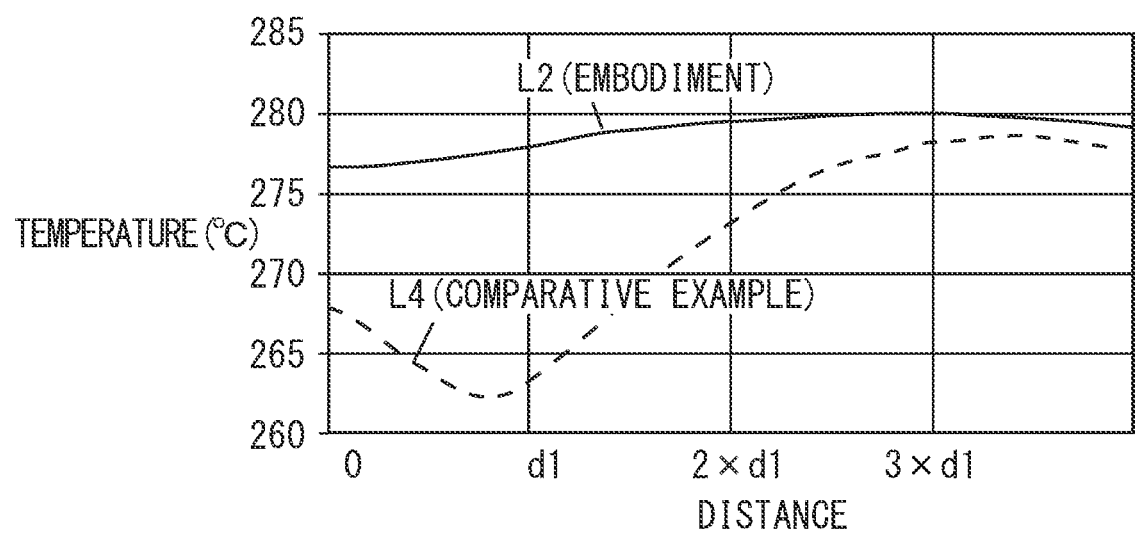
FIG. 5 is a diagram showing the temperature distribution in the axial direction.

FIGS. 4 and 5 are diagrams for explaining differences between the present embodiment shown in FIG. 2 and the comparative example shown in FIG. 3 and show the temperature distribution of the line pipe 21 in the axial direction. In regard to FIG. 4, the temperature of the ionization chamber 31 is 200° C., and the temperature of the heater block 22 (22A, 22B) is 250° C. In regard to FIG. 5, the temperatures of the ionization chamber 31 and the heater block 22 (22A, 22B) are 280° C. In FIGS. 4 and 5, the solid lines L1, L2 indicate the temperature distribution for the present embodiment, and the broken lines L3, L4 indicate the temperature distribution for the comparative example. In FIGS. 4 and 5, the ordinate indicates the temperature, and the abscissa indicates the distance from the tip of the line pipe 21. A distance d1 is the distance from the tip of the line pipe to the partition wall 240 to which the line pipe 21 is fixed. That is, with reference to FIG. 2, in regard to the distance d1 of the abscissa, the line pipe 21 is fixed to the partition wall 240, and the tip of the line pipe 21 inserted into the vacuum housing 34 from the partition wall 240 is located at a position corresponding to 0 in the abscissa.

Description will be made with reference to FIG. 4.

In regard to the present embodiment shown in FIG. 2, the partition wall 240 and the region of the line pipe 21 located at a position farther rightward than the position of the partition wall 240 is heated to 250° C. by the heater block 22, and a wall portion of the ionization chamber 31 is kept at 20° C. by a heater or the like. Heat dissipation in the region of the line pipe 21 fixed to the partition wall is almost limited to thermal conduction to the ionization chamber 31 and heat dissipation from a portion of the line pipe 21 projecting into the vacuum housing 34 (the region corresponding to 0 to d1 in FIG. 4). With reference to the line L1 of FIG. 4, the temperature decreases from about the distance 2×d1, and the temperature of the tip is about 245° C. and is slightly lower than 250° C. However, the temperature non-uniformity in the entire line pipe 21 is small, and a difference in temperature between a high temperature portion and a low temperature portion is suppressed to about 5° C.

On the other hand, in regard to the comparative example shown in FIG. 3, there is the clearance between the heater blocks 22A, 22B and the partition wall 240, and the partition wall 240 is not directly heated by the heater blocks 22A, 22B. The temperature of the partition wall 240 fixed to the vacuum housing 34 by the flange 241 is likely to be lower than the temperature (250° C.) of the heater blocks 22A, 22B. As a result, heat from the line pipe 21 is not only dissipated from the tip projecting from the partition wall 240, but also escape to the vacuum housing 34 through the partition wall 240. Also in a case where the heater blocks 22A, 22B are not sufficiently in contact with the partition wall 240, heat that similarly escapes to the vacuum housing 34 through the partition wall 240 cannot be ignored. As a result, as indicated by the line L3 of FIG. 4, the temperature decreases from around a position spaced apart from the tip by 3×d1, and the temperature of the tip decreases to about 220° C. That is, the temperature non-uniformity of the line pipe 21 in the axial direction is large, and a difference of about 30° C. in temperature is generated.

Description will be made with reference to FIG. 5.

FIG. 5 shows the temperature distribution in a case where the temperatures of the ionization chamber 31 and the heater block 22 (22A, 22B) are kept at the same temperature (=280° C.). In regard to the present embodiment indicated by the line L2, the temperature distribution has substantially similar tendency to that of the L1 of FIG. 4, and a difference in temperature between a high temperature portion and a low temperature portion is suppressed to be as small as 3° C. As a result, adsorption of a sample (a high boiling point component) in the interface 20 can be prevented.

On the other hand, in regard to the comparative example indicated by the line L4, the temperature decreases largely from the distance 3×d1 to the distance d1 and increases from about the distance d1 to the tip. This is because heat escapes from the portion of the line pipe 21 fixed to the partition wall toward the vacuum housing 34 through the partition wall 240. The temperature decreases largely near the portion fixed to the partition wall (the position spaced apart from the tip by the distance d1). A difference in temperature between a high temperature portion and a low temperature portion in regard to the axial direction of the line pipe 21 is about 15° C. and is larger than a difference in temperature between a high temperature portion and a low temperature portion in regard to the line L2.

As shown in FIGS. 4 and 5, with the configuration of the comparative example of FIG. 3, the temperature of the partition wall 240 is lower than the temperature of the portion heated by the heater blocks 22A, 22B of the line pipe 21, and a large amount of heat transfers toward the vacuum housing 34 through the partition wall 240. Thus, the temperature near a fixed portion of the line pipe 21 decreases largely, and the temperature distribution becomes non-uniform. Thus, adsorption of a sample (a high boiling point component) is likely to occur in a low temperature portion.

Modified Example 1

Figure 6:
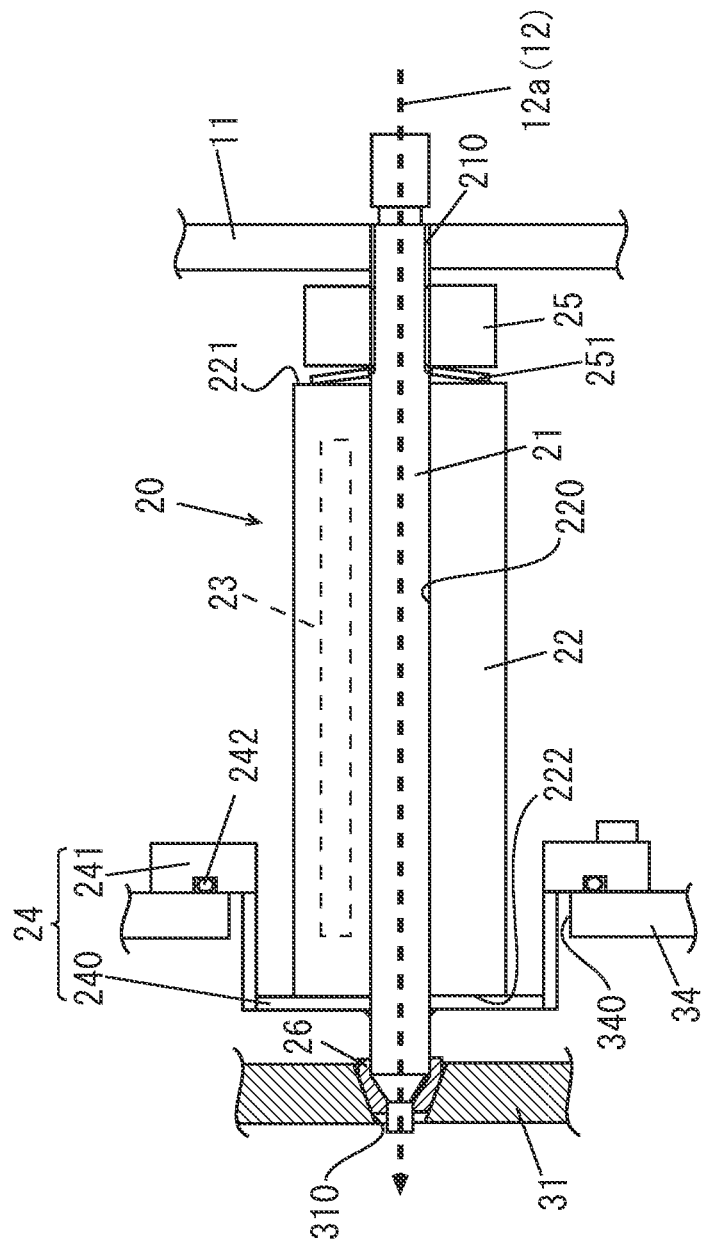
FIG. 6 is a diagram showing a modified example 1.

FIG. 6 is a diagram showing a modified example 1 of the above-mentioned embodiment. In the modified example 1, a disc spring 251, which is a spring member, is provided between a nut member 25 and an end surface 221 of a heater block 22. The rest of the configuration is similar to the configuration shown in FIG. 2. The disc spring 251 is deformed by rotation and fastening of the nut member 25, and the end surface 222 adheres to a partition wall 240 by pressure applied to the heater block 22 in the direction of the partition wall 240.

In this manner, the magnitude of the surface pressure of the end surface 222 with respect to the partition wall 240 can be controlled to correspond to a spring constant of the disc spring 251. Also in this case, the surface pressure of the end surface 222 with respect to the partition wall 240 can be increased. A difference in temperature between the heater block 22 and the partition wall 240 can be decreased because of improvement of efficiency of thermal conduction from the heater block 22 to the partition wall 240. As a result, similarly to the configuration of the FIG. 2, the temperature distribution of the line pipe 21 in the axial direction can be kept more uniform.

The spring member is not limited to the disc spring 251 as long as being elastically deformed in accordance with a fastening amount of the nut member 25 (that is, a rotation mount). For example, a wave washer or the like may be used.

Meanwhile, in regard to the configuration shown in FIG. 2, there is a problem that, when the heater block 22 thermally expands due to heating, excessive shear stress is applied to the engaging portion between the nut member 25 and the line pipe 21. On the other hand, in regard to the configuration shown in FIG. 6, because thermal expansion of the heater block 22 is absorbed by deformation of the disc spring 251, sheer stress can be prevented from becoming excessive.

Modified Example 2

Figure 7:
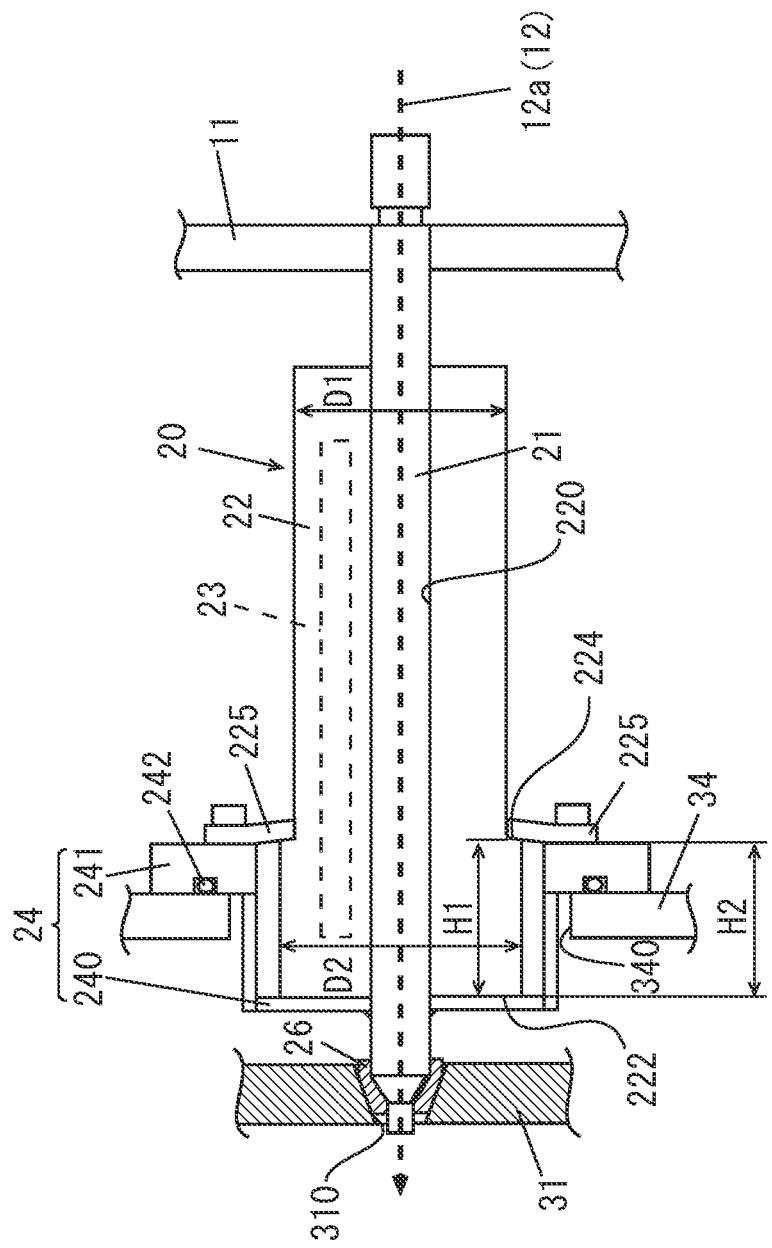
FIG. 7 is a diagram showing a modified example 2.

FIG. 7 is a diagram showing a modified example 2 of the above-mentioned embodiment. In the modified example 2, instead of the nut member 25 shown in FIG. 2, a pair of fixing plates 225 is provided in an interface 20 as a fixer for fixing a heater block 22 being in contact with a partition wall portion 24. The heater block 22 is formed of a columnar region having a diameter D1 and a columnar region having a diameter D2 (>D1), and a ring-shape step surface 224 is formed in its boundary portion. The pair of fixing plates 225 for fixing the heater block 22 to the partition wall portion 24 is fixed by bolts to the upper surface of a flange 241, and the tips of the fixing plates 225, that is, the inner peripheral ends of the annular fixing plates 225 abut against the step surface 224 of the heater block 22.

A height H1 from the end surface 222 to the step surface 224 of the heater block 22 is set larger than a height H2 from the bottom plate of the partition wall 240 to the upper surface of the flange 241 (H1>H2). When the fixing plates 225 are fixed to the upper surface of the flange 241 by bolts, the portion of the heater block 22 having the diameter D2 is interposed between the fixing plates 225 and the partition wall 240, and the end surface 222 of the heater block 22 is pressed against the partition wall 240. When being formed of a member that is elastically deformed such as a thin plate or a spring plate, the fixing plates 225 are elastically deformed when being fixed by bolts as shown in FIG. 7. The end surface 222 of the heater block 22 is pressed against the partition wall 240 by the elastically deformed fixing plates 225.

In this manner, when the end surface 222 comes into contact with the partition wall 240 with a large surface pressure, efficiency of thermal conduction from the heater block 22 to the partition wall 240 increases. Thus, a difference in temperature between the heater block 22 and the partition wall 240 can be reduced more sufficiently. As a result, similarly to the configuration of the FIG. 2, the temperature distribution of the line pipe 21 in the axial direction can be kept more uniform. While the pair of fixing plates 225 is used in the above-mentioned example, the number of fixing plates 225 is not limited to two. One ring-shape fixing plate may be provided, three or more rectangular fixing plates may be provided.

Modified Example 3

As shown in FIG. 3, also in regard to a heater block that is configured to fix the heater blocks 22A, 22B to the line pipe 21 to interpose the line pipe 21 therebetween, the nut member 25 shown in FIG. 2, or the nut member 25 and the disc spring 251 shown in FIG. 7 can be applied. With such a configuration, the end surfaces of the heater blocks 22A, 22B can be pressed against the partition wall 240, and uniformity of temperature distribution of the line pipe 21 in the axial direction of the line pipe 21 can be improved. Further, the step surface shown in FIG. 7 may be formed in the heater blocks 22A, 22B, and the heater blocks 22A, 22B may be fixed with the fixing plates 225.

Modified Example 4

Figure 8:
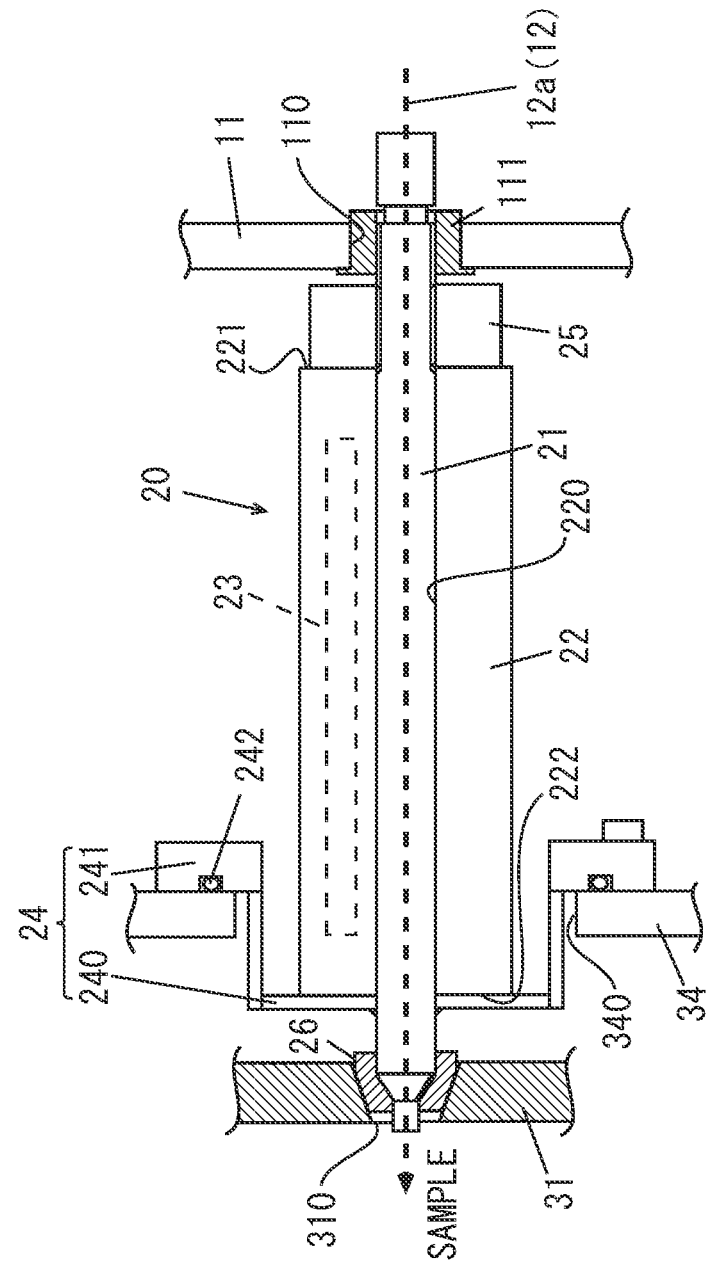
FIG. 8 is a diagram showing a modified example 4.

In a modified example 4 shown in FIG. 8, a heat insulating member 111 formed of a material having low thermal conductivity is arranged between a line pipe 21 and an opening 110. With such a configuration, escape of heat from an exposed portion of the line pipe 21 to open air can be prevented. The heat insulating member 111 can also be applied to the modified examples 1 and 2 shown in FIGS. 6 and 7.

It is understood by those skilled in the art that the above-mentioned illustrative embodiment and a plurality of modified examples are specific examples of the below-mentioned aspects.

[1] A gas chromatograph-mass spectrometer according to one aspect includes a gas chromatograph having a column that separates a sample into components, a mass spectrometer provided in a vacuum housing, and an interface that introduces a sample that has been separated into components in the gas chromatograph into the mass spectrometer, and the interface includes a partition wall fixed to the vacuum housing to close an opening formed in the vacuum housing, a line pipe that is fixed to the partition wall to penetrate the partition wall, includes a sample outlet line of the column and introduces the sample into the mass spectrometer, a heater that heats the line pipe in an axial direction, and a fixer that fixes the heater being in contact with the partition wall.

Because the heater is provided while being in contact with the partition wall by the fixer, the partition wall is directly heated by the heater. Therefore, a difference in temperature between the partition wall and the line pipe heated by the heater can be reduced, and escape of heat from the line pipe to the vacuum housing through the partition wall can be suppressed. As a result, uniformity of temperature distribution of the line pipe including the column can be improved, and adsorption of a sample (a high boiling point component) on a low temperature portion can be reduced.

[2] The gas chromatograph-mass spectrometer according to the above-mentioned [1], wherein the fixer presses the heater against the partition wall. A surface pressure of the contact portion between the heater and the partition wall is increased more sufficiently by pressure of the heater against the partition wall, and efficiency of thermal conduction from the heater to the contact portion is improved. As a result, a difference in temperature between the partition wall and the line pipe is reduced more sufficiently.

[3] The gas chromatograph-mass spectrometer according to the above-mentioned [2], wherein the heater is placed around the line pipe, the fixer is a nut member on which a female screw portion, that is to be engaged with a male screw portion formed on an outer periphery of the line pipe, is formed, and the heater is fixed to be pressed against the partition wall when the nut member is rotated and fastened with respect to the line pipe. A difference in temperature between the partition wall and the heater can be reduced by pressure of the heater against the partition wall, and escape of heat from the line pipe heated by the heater to the vacuum housing through the partition wall can be suppressed.

[4] The gas chromatograph-mass spectrometer according to the above-mentioned [3], wherein a spring member is arranged between the nut member and the heater. Because the spring member is deformed even in a case where the heater is thermally expanded, application of excessive shear stress to the engaging portion between the fixer and the line pipe can be prevented.

[5] The gas chromatograph-mass spectrometer according to the above-mentioned [2], wherein the fixer is a fixing plate that is fixed to the partition wall and interposes the heater between the fixer and the partition wall. The heater is interposed between the partition wall and the fixing plate, so that the surface pressure of the contact portion between the heater and the partition wall can be increased.

[6] The gas chromatograph-mass spectrometer according to any one of the above-mentioned [1] to [5], wherein the line pipe is a bar-shaped member having a first end portion fixed to the partition wall to penetrate the partition wall and a second end portion inserted into an opening provided in a casing of the gas chromatograph, and the second end portion is inserted into the opening through a heat insulating member. Because the second end portion is inserted into the opening through the heat insulating member, escape of heat from an exposed portion of the line pipe to open air can be prevented.

While various embodiments and a modified example are described above, the present invention is not limited to these content. Other aspects are possible without departing from the spirit and scope of the present invention.

REFERENCE SIGNS LIST

1 . . . Gas chromatograph-mass spectrometer, 10 . . . Gas chromatograph, 12 . . . Column, 20 . . . Interface, 21 . . . Line pipe, 22, 22A, 22B . . . Heater blocks, 23 . . . Heater, 24 . . . Partition wall, 25 . . . Nut member, 30 . . . Mass spectrometer, 31 . . . Ionization chamber, 32 . . . Separator, 33 . . . Detector, 34 . . . Vacuum housing, 111 . . . Heat insulating member, 210 . . . Male screw, 225 . . . Fixing plate, 240 . . . Partition wall, 250 . . . Female screw

The invention claimed is:

1. A gas chromatograph-mass spectrometer comprising:
a gas chromatograph having a column that separates a sample into components;
a mass spectrometer provided in a vacuum housing; and
an interface that introduces a sample that has been separated into components in the gas chromatograph into the mass spectrometer,
the interface comprising:
a partition wall fixed to the vacuum housing to close an opening formed in the vacuum housing;
a line pipe that is fixed to the partition wall to penetrate the partition wall, includes a sample outlet line of the column and introduces the sample into the mass spectrometer;
a heater that heats the line pipe in an axial direction; and
a fixer that fixes the heater being in contact with the partition wall,
wherein the fixer presses the heater against the partition wall,
the heater is placed around the line pipe,
the fixer is a nut member on which a female screw portion, that is to be engaged with a male screw portion formed on an outer periphery of the line pipe, is formed, and
the heater is fixed to be pressed against the partition wall when the nut member is rotated and fastened with respect to the line pipe.

2. The gas chromatograph-mass spectrometer according to claim 1, wherein
a spring member is arranged between the nut member and the heater.

3. The gas chromatograph-mass spectrometer according to claim 1, wherein
the line pipe is a bar-shaped member having a first end portion fixed to the partition wall to penetrate the partition wall and a second end portion inserted into an opening provided in a casing of the gas chromatograph, and
the second end portion is inserted into the opening through a heat insulating member.

4. A gas chromatograph-mass spectrometer comprising:
a gas chromatograph having a column that separates a sample into components;
a mass spectrometer provided in a vacuum housing; and
an interface that introduces a sample that has been separated into components in the gas chromatograph into the mass spectrometer,
the interface comprising:
a partition wall fixed to the vacuum housing to close an opening formed in the vacuum housing;
a line pipe that is fixed to the partition wall to penetrate the partition wall, includes a sample outlet line of the column and introduces the sample into the mass spectrometer;
a heater that heats the line pipe in an axial direction; and
a fixer that fixes the heater being in contact with the partition wall,
wherein the fixer presses the heater against the partition wall, and
the fixer is a fixing plate that is fixed to the partition wall and interposes the heater between the fixer and the partition wall.

5. The gas chromatograph-mass spectrometer according to claim 4, wherein
the line pipe is a bar-shaped member having a first end portion fixed to the partition wall to penetrate the partition wall and a second end portion inserted into an opening provided in a casing of the gas chromatograph, and
the second end portion is inserted into the opening through a heat insulating member.

* * * * *